(12) United States Patent
Jang et al.

(10) Patent No.: US 6,442,758 B1
(45) Date of Patent: Aug. 27, 2002

(54) MULTIMEDIA CONFERENCING SYSTEM HAVING A CENTRAL PROCESSING HUB FOR PROCESSING VIDEO AND AUDIO DATA FOR REMOTE USERS

(75) Inventors: Raymond Edward Jang, Coquitlam; Paul Joseph Geofroy, Burnaby; Paul Robert Russell, Port Coquitlam; Susan Elizabeth Wilson, Burnaby, all of (CA)

(73) Assignee: Convedia Corporation, Burnaby (CA)

( * ) Notice: Subject to any disclaimer, the term of this patent is extended or adjusted under 35 U.S.C. 154(b) by 0 days.

(21) Appl. No.: 09/404,310

(22) Filed: Sep. 24, 1999

(51) Int. Cl.[7] .............................................. H04N 7/173
(52) U.S. Cl. ...................................... 725/119; 725/109
(58) Field of Search ................................ 725/119, 109; 345/501; 370/216; 710/314; 709/217

(56) References Cited

U.S. PATENT DOCUMENTS

| | | | |
|---|---|---|---|
| 5,737,011 A | 4/1998 | Lukacs | |
| 5,796,424 A | 8/1998 | Ely et al. | |
| 5,838,683 A | * 11/1998 | Corley et al. | ............... 370/216 |
| 6,006,300 A | * 12/1999 | Toutant | ...................... 710/314 |
| 6,205,137 B1 | * 3/2001 | Ariga | ......................... 710/314 |
| 6,347,344 B1 | * 2/2002 | Baker et al. | ................ 345/501 |

* cited by examiner

Primary Examiner—Le Hien Luu
(74) Attorney, Agent, or Firm—Marks & Clerk

(57) ABSTRACT

A multimedia conferencing system has a plurality of remote user terminals, each of which may be different from any other, and each of which may communicate to a central processing hub using different communications protocols. The central processing hub receives, processes, and sends video and audio data from and to the plurality of remote users, and comprises a media bus for handling video and audio data signals, a packet bus for handling data and control signals, a shelf controller card which issues control messages in keeping with incoming management signals, a bus controller card which provides clock and bus arbitration signals, at least one media processor card for processing video and audio signals, and video encoding means for receiving video data from the one or more media processor cards and delivering video data signals to the packet bus. Video and audio data signals may be received by or delivered from any of the at least one media processor card and the at least one physical interface card. A management node communicates through the shelf controller card to permit management signals to be delivered, which may come from a session manager so as to control the nature of the output video and audio data signals which are sent to the remote user terminals. A video link and a video router permit summing of video data signals, and the resultant summed video data signal is passed to a further video data link via the video router so that the video data signal which is returned to the remote terminals is derived from a cascade of video links.

29 Claims, 10 Drawing Sheets

MULTIMEDIA CONFERENCING SYSTEM HAVING A CENTRAL PROCESSING HUB FOR PROCESSING VIDEO AND AUDIO DATA FOR REMOTE USERS

FIELD OF THE INVENTION

This invention is directed to a multimedia conferencing system, and is particularly directed to a central processing hub—sometimes referred to as a digital media forum—whose purpose is to receive video and audio data signals from remote user terminals, process them in one way or another, and to deliver composite video and audio signals to the remote user terminals. The criteria which govern the nature of the composite video and audio signals which are delivered to any remote user terminal may vary from one remote user terminal to another, and they may vary from time to time with respect to any remote user terminal.

BACKGROUND OF THE INVENTION

A multimedia conferencing system is one which utilizes a variety of media types and sources, particularly utilizing live or real-time video and audio sources from a plurality of remote users. Those remote users may be geographically scattered very widely, ranging from being located in different areas of the same office building, to different cities, and even to different continents.

In order to maintain a multimedia conferencing system, a central processing hub is required, which must function as a multipoint control unit. This enables a plurality of participants to conduct a multi-party multimedia conference.

A multimedia conference will comprise at least two participants, and up to very many participants. The total number of participants in any particular multimedia conference is dynamically configurable, as discussed in detail hereafter, and is limited only by the particular hardware configuration being employed. However, one aspect of the present invention, as will be described hereafter, is the fact that the hardware configuration may be dynamically configurable. Moreover, so a plurality of substantially identical central processing hubs may be cascaded one to another, as described hereafter.

In keeping with a particular aspect of the present invention, each participant in any multimedia conference may utilize different video, audio, and data compression technology than any other participant, they may use different multimedia control protocols than any other participant, and they may even communicate within the dynamically configured multimedia conference using different transmission rates and different network protocols.

Accordingly, the present invention provides a platform upon which there may be established inter-operability between disparate multimedia network types, and inter-operability between different multimedia terminal types, along with multi-party multimedia communications.

As will be described in greater detail hereafter, the central processing hub of the present invention provides a multimedia platform which will support a family of products that meet the communication requirements noted above. At the core of the central processing hub, there is a fully redundant backplane—having regard to the system architecture—which provides high-speed media and packet buses. These buses allow for high-speed switching and interconnection with other central processing hubs as may be required. Connected to the media and packet buses are a plurality of line cards, again having regard to the system architecture, which provide for a variety of functions that are necessary in any multimedia conferencing system, including media processing, video encoding, shelf control, bus control, line interface requirements, and so on. Such architecture is described in greater detail hereafter, along with detailed discussion of various ones of the line cards which are employed.

When multimedia conferencing occurs, multiple remote sites can participate in live, real-time, multi-party multimedia conferences. With collage conferencing, a video collage is assembled at the central processing hub and forwarded or transmitted to the various participants in the then ongoing multimedia conference. As will be discussed hereafter, the video collage which is sent to various participants may differ from one participant or remote user site to another participant or remote user site. Generally, any multimedia conference is controlled by a so-called Session Manager. However, as will be noted hereafter, the session manager is not necessarily an individual person, it may be an intelligent network or a personal computer which operates in keeping with certain predetermined criteria to establish the nature of the video and audio signals which are delivered to the remote user terminals.

A multimedia conferencing system in keeping with the present invention, as described hereafter, will support many individual input streams, which may have varying speeds and protocols. Video pre-processing may be required, including scaling depending on the protocol being used. Video post-processing will include creation of a collage, whereby various video images may be placed in different positions, each video image having a controlled size—which may vary from image to image within the collage, and which vary from time to time with respect to any and all images being presented.

Audio pre-processing may occur, including adjusting and controlling the volume for each participant. Also, audio post-processing may occur, particularly in such a manner as described hereafter whereby the audio signal which is sent to any participant will be processed in such a manner that they will not receive an audio signal containing his or her own audio input.

As indicated previously, and as will be discussed in greater detail hereafter, central processing hubs in keeping with the present invention are each such as to include a high-speed backplane which may be connected one to another so as to be cascaded. Moreover, a cascaded plurality of central processing hubs will function as if it were a single large-scale processing hub.

The present invention provides a multimedia conferencing system whereby a number of different providers, each of which may operate a proprietary network protocol or protocols, may be interlinked one with another through the central processing hub. Accordingly, the present invention will provide a platform for a conferencing system including a management node and a central processing hub by which gateway and multipoint control are provided. By providing appropriate functionality and management control software for the various functional units, line cards, and backplane circuitry included in a central processing hub in keeping with the present invention, the precise nature of the central processing hub in keeping with the present invention is essentially transparent or not noticeable to networks—including various service providers who may deliver multimedia conferencing video and audio data signals to the central processing hub. Thus, the various service providers may invest their resources in delivering video and audio content in keeping with their own transmission protocols, rather than having to satisfy specific input protocols as is generally the case in the industry prior to the present invention having been developed.

DESCRIPTION OF THE PRIOR ART

A typical patent which describes prior art video conferencing systems is LUKACS U.S. Pat. No. 5,737,011, which teaches a video conferencing system which is said to be infinitely expandable, and which is a real-time conferencing system. In this patent, each of the conference participants has the ability to customize their own individual display of other participants, using a chain of video composing modules which can be expanded so as to combine video signal streams from any number of conference participants in real time. Different media types may be associated through appropriate software and manipulated for multimedia uses. The Lukacs system is such as to allow each individual user to dynamically change who can receive the information that they provide to the conference.

ELY et al. U.S. Pat. No. 5,796,424 describes a system and method for providing video conferencing services where a broadband switch network, a broad-band session controller, and a broadband service control point are provided. Here, connections are provided between information senders and receivers in response to instructions from the broadband service control point or in response to requests which are originated by any remote information sender/receiver. The broadband service control point provides processing instructions and/or data to the broadband controller and to each remote sender/receiver. The system is particularly directed to video-on-demand utilization. Whenever a user requires a video from a video information provider, the broadband session controller establishes communication between the set top controller at the remote user's location and the video information provider, requesting processing information from the broadband service control point in response to predetermined triggers. A broadband connection between a video information provider and a specific user is established under control of the broad-band session controller. If the system is to be used in video conferencing, the set top controller will control cameras, microphones, and so on. Telephone services may also be provided over the same integrated network.

SUMMARY OF THE INVENTION

The present invention provides a multimedia conferencing system and, in particular, a central processing hub therefor. The multimedia conferencing system comprises the central processing hub and a plurality of remote user terminals; and each of the remote user terminals at least comprises means for sending video data signals and audio data signals to the central processing hub, and means for receiving video data signals and audio data signals from the central processing hub. Under the scheme of the present invention, the central processing hub receives the video and audio data from each of the plurality of remote user terminals, processes the received video data and audio data, and returns a video data signal and an audio data signal to each of the remote user terminals which includes video data and audio data, respectively, from at least one of the plurality of remote user terminals.

The central processing hub comprises a media bus whose purpose is to handle video and audio data signals within the central processing hub. The media bus can accommodate real-time distribution of media types such as compressed or uncompressed digital video data and audio data. A packet bus is also provided, whose purpose is to handle data and control signals within the central processing hub, where the data or control signals are sent in blocks or packets of data.

A shelf controller card is included in the central processing hub, for issuing control messages to control the operation of the central processing hub in keeping with incoming management signals which are delivered directly to the shelf controller card. A bus controller card is also provided so that at least clock signals and bus arbitration signals are generated and distributed within the central processing hub.

A further card included in the central processing hub is at least one physical line interface card, whose purpose is to provide the physical interface port or ports for the central processing hub. The physical interface card may also provide data link layer functions.

At least one media processor card is provided for processing video and audio data signals within the central processing hub. Thus, most of the multimedia processing for the media conferencing system is carried out in the media processor card. In the egress direction, the media processor card receives data from the physical line interface card, reassembles or defragments the data, demultiplexes it as necessary, decodes the data, pre-processes and bridges audio and video streams. In the ingress direction, the media processor card receives compressed video data in the form of transport packets from the video encoding means, compresses bridged audio, multiplexes the audio with the video, segments or fragments the data, and sends the resulting cells or frames to the physical line interface card.

Means are provided for video encoding, and the video encoding means receives video data from each of the at least one media processor card and delivers video data signals to the packet bus. The means for encoding may perform video post-processing, compress the video, encapsulate the compressed video into transport packets, and send the resulting packets via the packet bus to a media processor card.

Video and audio data signals received from the plurality of remote user terminals are received at the central processing hub by any one of the at least one media processor card or at least one physical interface card. The received video and audio data signals are passed via one of the media bus and the packet to the at least one media processor card for further processing. Signals which are delivered from the central processing hub to the plurality of remote user terminals are delivered from the central processing hub by any one of the at least media processor card and the at least one physical interface card. In keeping with the present invention, the means for sending and receiving video and audio data signals to one of the plurality of remote user terminals may differ from one remote user to another. Moreover, each of the plurality of remote user terminals may communicate with the central processing hub using a different communications protocol than any of the other remote user terminals. Thus, the central processing hub provides a gateway function whereby remote users can communicate across different network boundaries.

The video encoding means which is provided in the central processing hub may be a separate video encoder card, or it may be included in at least one of the media processor cards.

The shelf controller card further comprises means for communicating with a management node. Thus, management signals for the central processing hub can be delivered from the management node through the shelf controller to the central processing hub.

Any given multimedia conference, and the nature of the output video and audio data signals which are sent to the plurality of remote user terminals in that conference, is controlled by the session manager communicating through an input port on the management node. The session manager may be an intelligent network, it may be a personal computer, or the session manager may be an individual person who interacts with an intelligent network or a personal computer, and thence to the central processing hub through the management node.

The video and audio data signals which are received from and delivered to each of the plurality of remote user terminals are generally in the form of compressed signal packets. However, they may be in the form of analog signals which are passed to and from the central processing hub via analog ports on the at least one media processor card. In either case, compressed signal packets are delivered from the video encoding means to the packet bus, and bi-directionally between the packet bus and any one of the at least one interface card and the at least one media processor card. Uncompressed video and audio real-time signals are delivered uni-directionally between the media bus and any of the at least one media processor card and the video encoding means.

An important feature of the present invention is that the at least one media processing card includes a video link and a video router, so that data signals from any of the plurality of remote user terminals are summed within the media processing card, and the resultant summed video data signal is passed to a further video link via the video router. Thus, the returned video data signal from the central processing hub to the plurality of remote user terminals is derived from a cascade of video links.

Moreover, additional central processing hubs may be connected through the bus controller card so that the media bus and packet bus of the further central processing hubs are connected together. In this case, the interconnected central processor hubs share resources, control signals, clock signals, and bus arbitration signals. Moreover, the at least one video link on the at least one media processing card, of each of a plurality of similar central processing hubs, are cascaded one with respect to another.

In one embodiment of the present invention, the summed video data signal which is delivered to each of the remote user terminals is a common signal which is delivered to all of the remote user terminals. In another aspect of the present invention, the summed video data signal is under the control of the session manager, and each respective one of the summed video data signals will include video data from at least one other of the remote user terminals—but not necessarily all of the other remote user terminals.

Even when the summed video data signal is a common signal delivered to all of the remote user terminals, it may also be under the control of the session manager, and thus the video signal in the summed signal which is representative of any remote user terminal may be changed by the session manager.

However, in most instances, the audio data signal which is delivered to each of the remote user terminals includes audio data from at least one other of the remote user terminals, but excludes audio data from the respective remote user terminal to which the summed audio signal is delivered.

The media bus will comprise at least one video bus and at least one audio bus, and generally there are a plurality of video buses and a plurality of audio buses operating in parallel one to another so as to provide for increased bandwidth. There may be at least two audio buses which are adapted to be operated in parallel so as to increase the bandwidth of the composite audio bus over the bandwidth of one audio bus; or, two separate audio buses may be operated so as to provide stereo audio signals.

In any event, there is generally a plurality of video buses and a plurality of audio buses included in the media bus, so that there is redundancy provided with respect to the video buses and audio buses. Moreover, there is generally a plurality of physical line interface cards and a plurality of media processor cards, so that there is redundancy provided with respect to the physical line interface cards and media processor cards.

Still further, additional physical line interface cards and additional media processor cards may be added to the central processing hub at any time, by being connected to the media bus and the packet bus. This provides for dynamic expansion of the central processing hub.

In keeping with the present invention, each of the respect cards included in the central processing hub performs pre-designated tasks in keeping with respective instruction sets which are in respective microprocessors on each respective card. Those tasks are also performed further in keeping with control signals which are delivered to each respective card over the packet bus.

Each media processor card will perform tasks such as signal decoding of video data and audio data received by the media processor card. Signal routing of the video and audio data, signal scaling of the video and-audio data, and time-base correction of the video and audio data received by the media processing card may also be carried out. The video data and audio data may be linked from one media processor card to another.

The video data signal which is received from any of the plurality of remote user terminals will include a video stream and it may also include other data such as graphics data, text data, or spread sheet data recovered from a computer at the respective remote user terminal site. That additional graphics data, text data, or spreadsheet data which is received by the central processing hub may be distributed to others of the remote user terminals in the form that it has been received, or it may be processed by the central processing hub and distributed as processed data.

It is an object of the present invention to provide a multimedia conferencing system including a central processing hub, whose architecture is such that the system is dynamically configurable.

A further object of the present invention is to provide a central processing hub which will function as a multimedia platform that supports a family of products having differing communication protocols, differing transmission rates, and even differing signal handling technologies at respective remote user terminals.

Still further, the present invention provides a system whereby a plurality of individual input streams having varying speeds and protocols may be controlled in such a manner that the returned video data signal which is received by each of the plurality of remote user terminals from the central processing hub is derived from a cascade of video links within the central processing hub.

These and other features of the invention will be described in greater detail hereafter.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
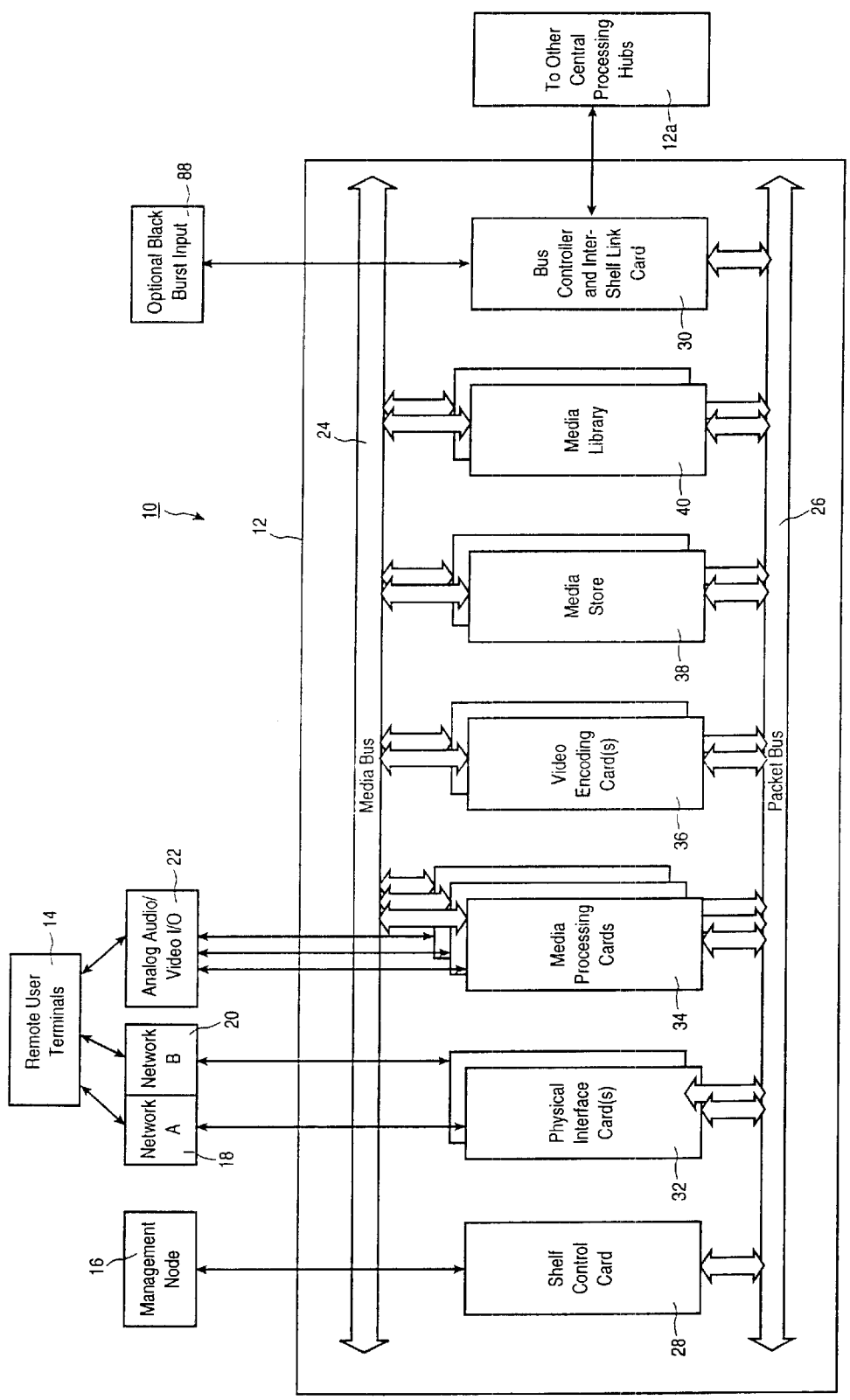
FIG. 1 provides a simplified block schematic diagram of a multimedia conferencing system in keeping with the present invention.

Turning first to FIG. 1, a block schematic diagram of a multimedia conferencing system in keeping with the present invention is shown. The multimedia conferencing system 10 comprises a plurality of principal elements, including a central processing hub 12, a plurality of remote user terminals shown collectively at 14, and a management node 16. The central processing hub 12 communicates across its own boundary with the management node 16; and, as described hereafter, it may communicate to other central processing hubs shown collectively at 12a. As will described hereafter, the central processing hub 12 may communicate with the remote user terminals 14 through a variety of different means, including through such as proprietary networks 18, 20, and in some cases via analog audio and video input/output devices shown collectively at 22.

Within the central processing hub 12, there is located a media bus 24, a packet bus 26, a shelf controller card 28, a bus controller card 30—which acts as an inter-shelf link card in the architecture to be described hereafter—at least one physical interface card 32, and at least one media processing card 34. FIG. 1 shows at least one video encoder card 36, however the video encoding means may be included on the media processor card or cards, as described hereafter.

FIG. 1 shows that a media store card or cards 38, and media library card or cards 40 may also be included in the central processing hub. However, the media store card or cards 38 and the media library card or cards 40 are not otherwise considered in the present invention, but are optional additions within the shelf architecture of the central processing hub 12.

Each of the remote user terminals 14 will at least comprise means for sending video data signals and audio data signals to the central processing hub 12, and means for receiving video data signals and audio data signals from the central processing hub 12. Each of the remote user terminals may also comprise an appropriate computer for generating, storing, sending, and receiving graphics data, text data, spread sheet data, and combinations thereof.

The principal purposes of the central processing hub are to receive the video and audio data from each of the plurality of remote user terminals 14, and to process the received video and audio data so as to return a video data signal and an audio data signal to each of the remote user terminals 14. The video and audio data signals which are returned to each of the remote user terminals will include video data and audio data from at least one other of the plurality of remote user terminals 14.

Typically, each remote user terminal 14 will have a camera or cameras, or other video sources, and a video monitor or TV screen. Microphones or other audio sources will be employed, and speakers or headphones will be provided for each conference participant to hear the returned audio signal which is sent to each respective user terminal 14. A processing engine will be provided for handling conference control functions and running any shared application computer programs that may be utilized. Typically, the video sources will feed into video compressors, and the audio sources will feed into audio encoders, with the resultant compressed video and audio data being transported to the central processing hub 12. However, the video and audio output from any remote user terminal 14 may also be analog in nature, and will be transmitted accordingly.

Each of the specific modular entities in the central processing hub 12—namely, the media bus 24, packet bus 26, shelf control card 28, bus controller card 30, the at least one physical interface card 32, and the at least one media processing card 34, together with the video encoding means 36—are all described in greater detail hereafter. For the moment, it is sufficient to note that the media bus 24 will handle video and audio data signals within the central processing hub 12, the packet bus 26 will handle data and control signals within the central processing hub 12, and the shelf controller card 28 will issue control messages to control the operation of the central processing hub in keeping with incoming management signals which are delivered to it from the management node 16. The bus controller card provides at least clock signals and bus arbitration signals within the cental processing hub 12 and, as noted hereafter, provides means for connecting to other central processing hubs 12a. The at least one physical interface card 32 provides at least one physical interface port for the central processing hub 12, whereby the central processing hub 12 may communicate to the remote user terminals 14 such as through proprietary networks 18 and 20. Moreover, the central processing hub 12 may also communicate to the remote user terminals 14 via an analog port provided on the at least one media processor card 34, which also processes video and audio signals within the central processing hub 12.

Accordingly, it will be understood that there are two levels of hierarchy within the central processing hub 12. They include the modular or card level of hierarchy—the various buses and cards that are physically mounted on an appropriate shelf within which the central processing hub is assembled; and the function blocks which are within the various modules, including particularly those which are within the various cards such as the media processor card. However, it will be noted that video encoding means, in particular, may reside at either of the two levels of hierarchy; in that a video encoder card may be included in the central processing hub, or the video encoding function may be carried out in a functional block included in a media processor card.

In keeping with the architecture of the present invention, the number of participants in any particular multimedia conferencing session may vary from session to session. In any event, the number of individual participants that may be accommodated in any multimedia conferencing session is not only scalable, it is dynamically scalable, and is limited only by the number of media processor cards which may be available in the particular hardware configuration. Accordingly, the present invention also provides for interlinking of additional central processing hubs, whereby the respective media buses and packet buses of the interlinked central processing hubs function as a single entity.

Moreover, it is also possible to support a number of individual conferences simultaneously, in keeping with the present invention, where the number of individual conferences is also limited by the number of media processor cards which are available.

As will be noted, each remote terminal will generally receive a customized audio signal which is created separately for each multimedia conference participant. That signal is such that each multimedia conference participant will receive the audio from all of the other participants, but not his or her own audio. This makes it easier for each participant to listen to the other participants in a summed audio signal, because the incoming conference signal does not include that respective participant's audio output to the multimedia conference.

Likewise, while it is usual that only a signal video encoder will be utilized, some conditions may exist where more than one encoder will be required.

When the bus controller card 30 functions as a bus extender card to provide interlinking with other central processing hubs 12a, the physical links by which the media bus and packet bus of one central processing hub 12 are connected to the media bus and packet bus of another central processing hub 12a, include high-speed fibreoptic links so as to provide adequate bandwidth between the respective central processing hubs 12, 12a. Accordingly, any data which is on the backplane of the central processing hub, where the media bus and packet bus reside, may be selected to be sent to another central processing hub 12a, and data from another central processing hub 12a may be placed on the media bus and/or packet bus of any respective central processor hub 12.

Figure 2:
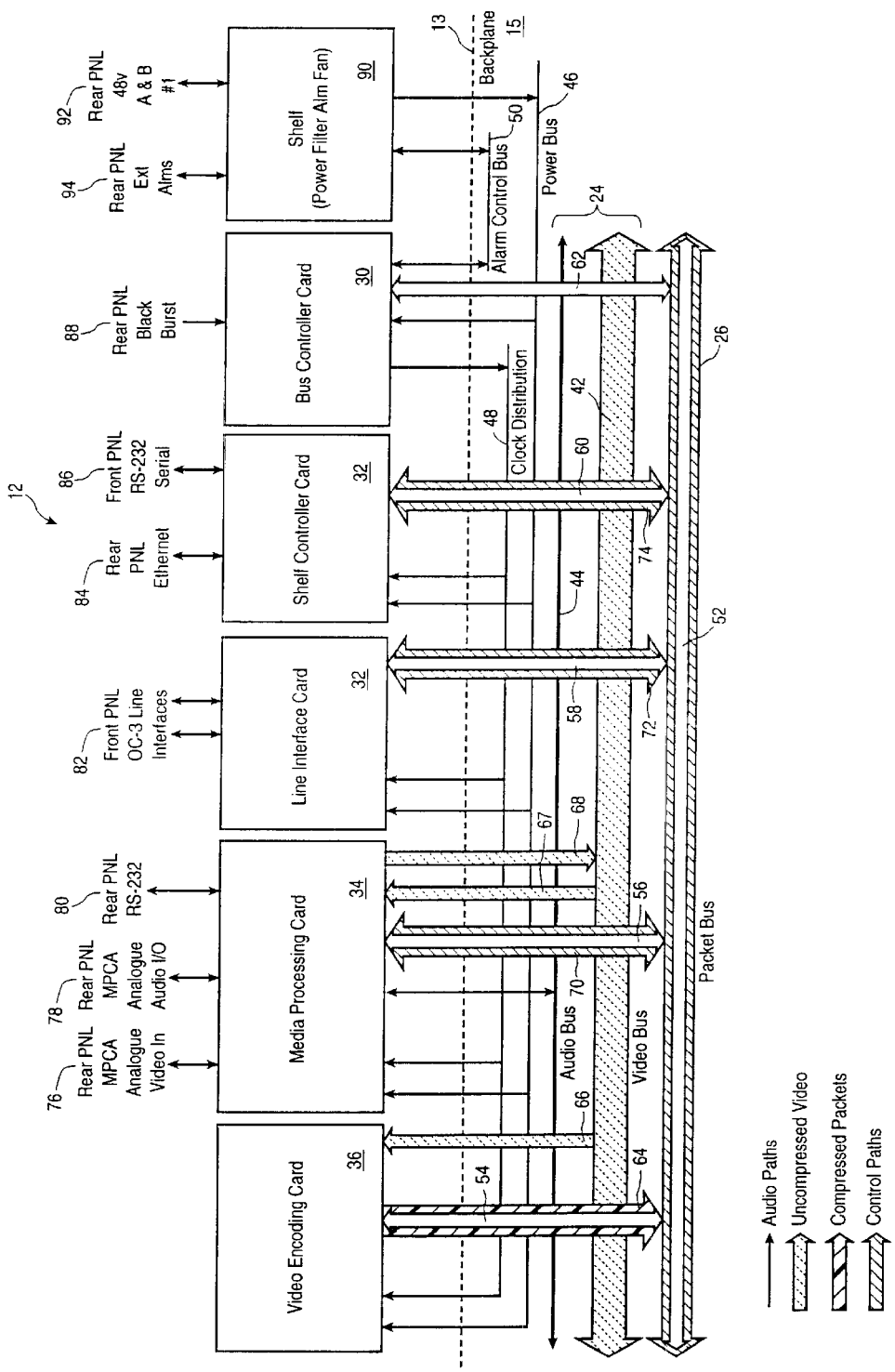
FIG. 2 is a more detailed block schematic diagram of a central processing hub, showing typical interconnection between the cards in the central processing hub, and showing typical data and signal flow within the central processing hub.

Having regard to FIG. 2, typical data flow among and between the various cards in a central processing hub 12 is shown. The architecture of the central processing hub 12 is indicated. The line 13 shows the presence of various cards, as discussed hereafter, mounted on a shelf, with the backplane of the central processing hub 12 being indicated below the line 13 and comprising all of the various buses which are found within the central processing hub 12.

The packet bus 26 is shown, as is the media bus 24. However, the media bus 24 is shown to comprise a video bus 42 and an audio bus 44. Indeed, as will be noted hereafter, the video bus 42 and the audio bus 44 will, themselves, comprise a plurality of respective video buses and audio buses. For purposes of control of the central processing hub 12, there is also shown a power bus 46, a clock distribution bus 48, and an alarm control bus 50.

Various control paths exist in the central processing hub 12, and are shown respectively at 52, 54, 56, 58, 60, and 62. It will be seen that a control path 52 is included in the packet bus to transfer control signals to and from the bus controller card 30, at 62; to and from the video encoder card 36 (when used), at 54; to and from any media processor card 34, at 56; to and from any line interface card 32, at 58; and to and from the shelf controller card 28, at 60. FIG. 2 also shows that compressed video packets pass from the packet bus 26 and video encoder card 36, when used, as shown at 64. Uncompressed video passes from the video bus 24 to the video encoder card 36, when used, or other video encoding means as has already been noted, as shown at 66. Other uncompressed video paths are shown at 67, 68, showing communication from the video bus 24 to a media processor card 34, and vice versa.

Compressed packet communication is also shown to occur bi-directionally along the packet bus 26, and bi-directionally along between the packet bus 26 and any media processor card 34, any line interface card 32, and the shelf controller card 28, as shown at 70, 72, and 74, respectively.

Card connections to external devices are shown, as well, in FIG. 2. For instance, analog video and audio inputs to and from a media processor card 34 are shown at 76 and 78, by which the media processor card 34 communicates to the analog audio and video input/output circuitry shown generally at 22 in FIG. 1. There may also be an optional RS-232 connection at 80. Interface connections from a line interface card 32 by which communication to networks 18 or 20 may be established, are shown are 82 in FIG. 2. Still further, the shelf controller card may have an Ethernet port 84, an RS-232 serial port 86, or an ATM port (not shown) for communication with the management node 16.

An optional black burst input is shown at 88 in FIGS. 1 and 2, and it may communicate with the bus controller card 30. Finally, a power filter, alarm monitor, and fan module 90 for the central processing hub 12 filters power provided from a power source 92, and provides for communication to external alarms at 94.

As will be seen, compressed data is provided from the packet bus 26 at 70, along with control signals at 56, to the packet backplane interface 100. From there, control signals are handled through the control processor 104 to a bus arbitrator 105, and to the packet processor 106. Compressed data is passed from the packet backplane interface 100 to the packet processor 106, and thence to the module 108, together with control signals, as shown at 109 and 111, respectively. From the module 108, which includes an MPEG packet processor 113, compressed video data is passed to an MPEG demultiplexer and decompresser 110. Then, uncompressed video is directed to the video preprocessor module 115 which is found in the module 112. At the same time, audio signals are returned from the MPEG demultiplexer and decompression module 110 to an audio pre-processor 117 which is found in the module 108, and thence to the audio backplane interface 114.

Figure 3:
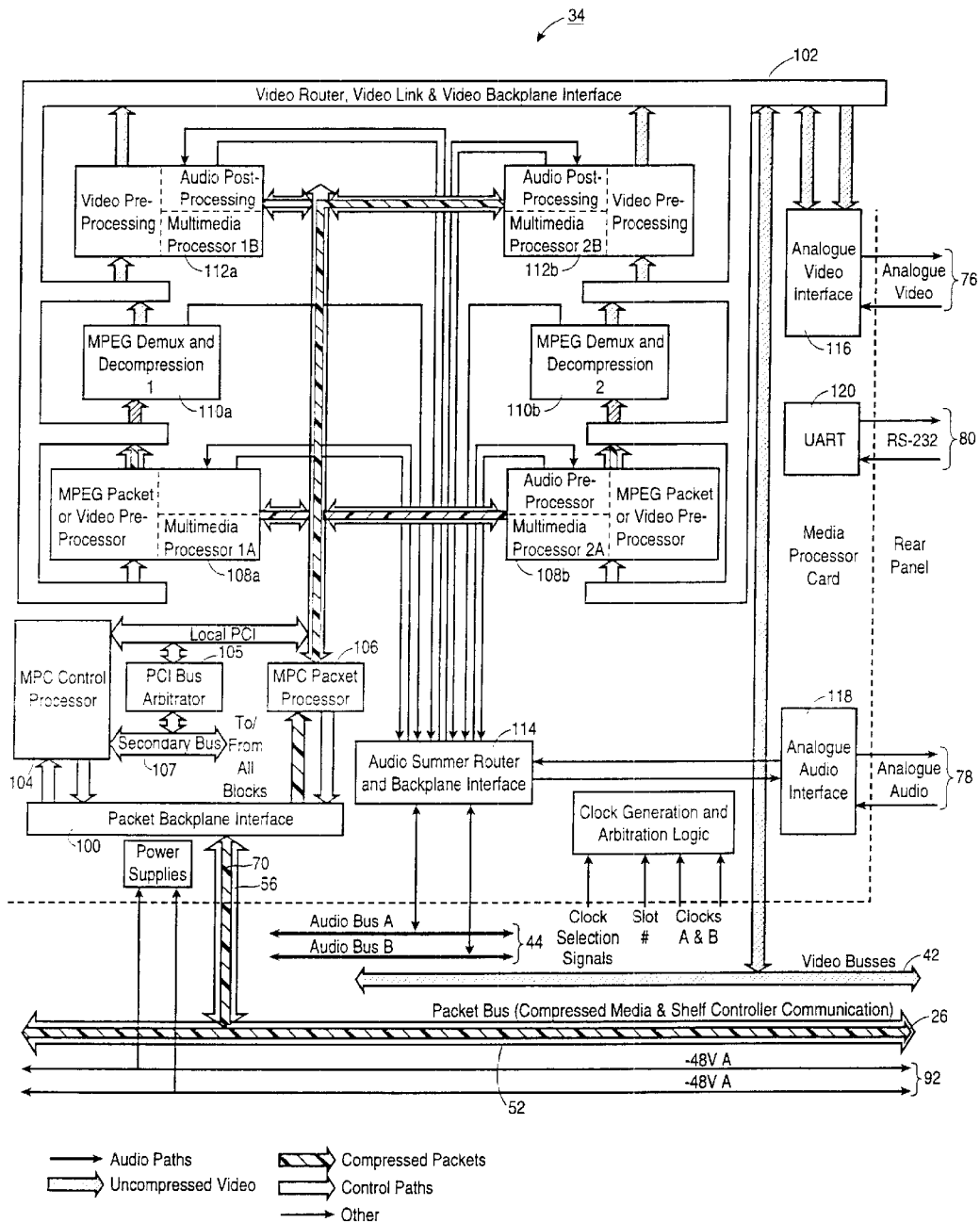
FIG. 3 is a more detailed block schematic diagram of a media processor card.

After the uncompressed video signal is pre-processed in the video pre-processing module 115, it is passed to a video link 122—which is found in the video router, video link, and video backplane interface 102 indicated in FIG. 3. The video link 122 serves to receive uncompressed video from any video bus 42, and to return uncompressed video signals to the video bus 42.

Also, the audio backplane interface 114 includes an audio summer 124, to receive audio data from the audio buses shown generally at 44. The audio summer 124 sends audio signals to the audio post-processing module 119, within the module 112.

It will be noted that audio data received from the audio pre-processor sub-module 117 may be split in the audio backplane interface 114, as shown at 126. This may accomplish one of two things: Either the audio signal may be split between two individual audio buses so as to achieve greater bandwidth, or it may be split into stereo signals, one of each of which is sent to a respective audio bus within the audio bus system 44.

Figure 5:
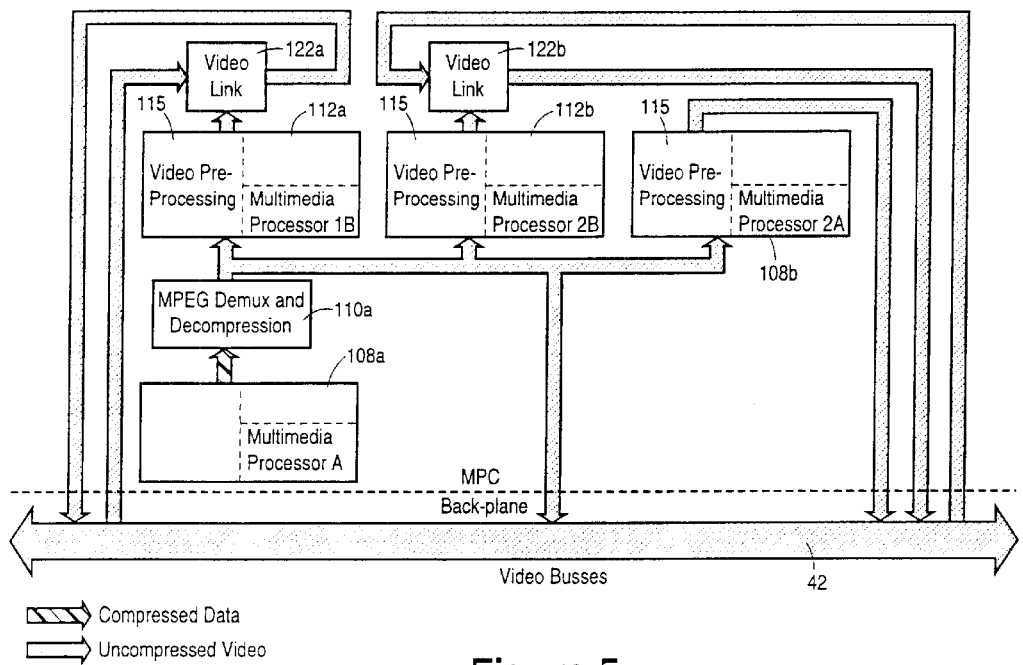
FIG. 5 shows the signal interconnection in a media processor card for MPEG video sources, for multiple sub-frames of a media processor card.

FIG. 5 shows the manner in which video signals may be cascaded. In this case, the incoming video signals from the individual remote user terminals are received in compressed form; and, to continue the example which is being discussed, it is assumed that the compressed form may be in keeping with MPEG compression protocols.

Here, compressed data is transferred from the module 108a to the demultiplexer and decompresser 110a. From there, uncompressed video data is transferred to the video pre-processing module 115 in each of modules 112a and 112b. In this case, it is noted that there is also a video pre-processing sub-module 115 in module 108b. The processed video signal from the module 108b is returned to a video bus 42. However, the video output signals from the video pre-processing sub-modules 115 in each of modules 112a and 112b are passed to respective video links 122a and 122b, from whence uncompressed video signals are sent to the video bus 42. Moreover, it will be noted that each video link 122a and 122b also receives uncompressed video signals from the video bus. Moreover, the output of the demultiplexer and decompresser 110a is also returned to the video bus 42. Accordingly, it can be seen from FIGS. 4 and 5, in particular, how uncompressed video signals are demodulated and decompressed from a video source, and are cascaded through a plurality of video links 122 via the video bus 42.

Of course, it will be kept in mind that the video bus 42, in fact, comprises a number of parallel video buses, as noted elsewhere.

Figure 4:
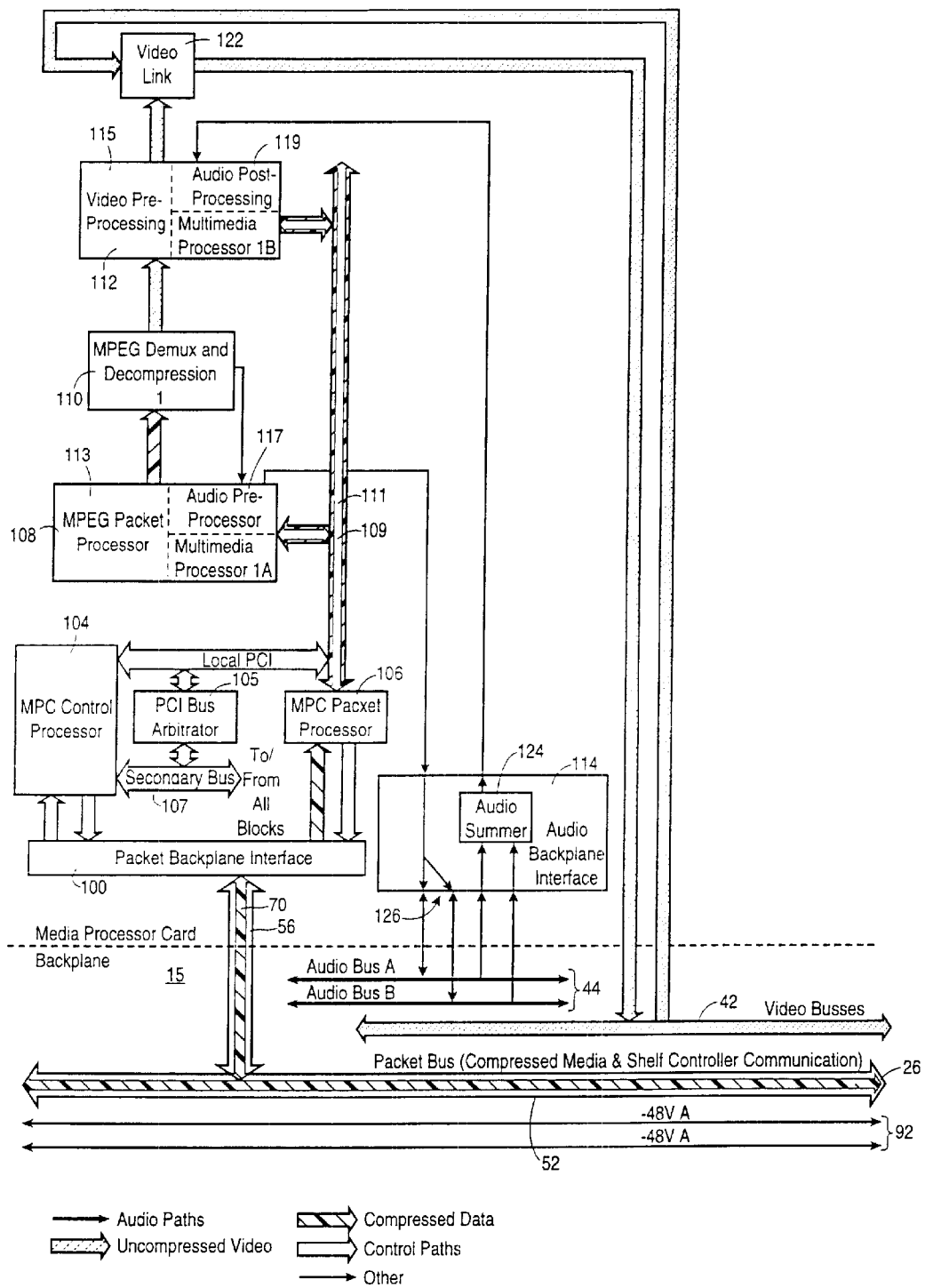
FIG. 4 is a signal flow diagram showing signal flow in a media processor card for MPEG video and audio sources, for a single sub-frame of a media processor card.
Figure 6:
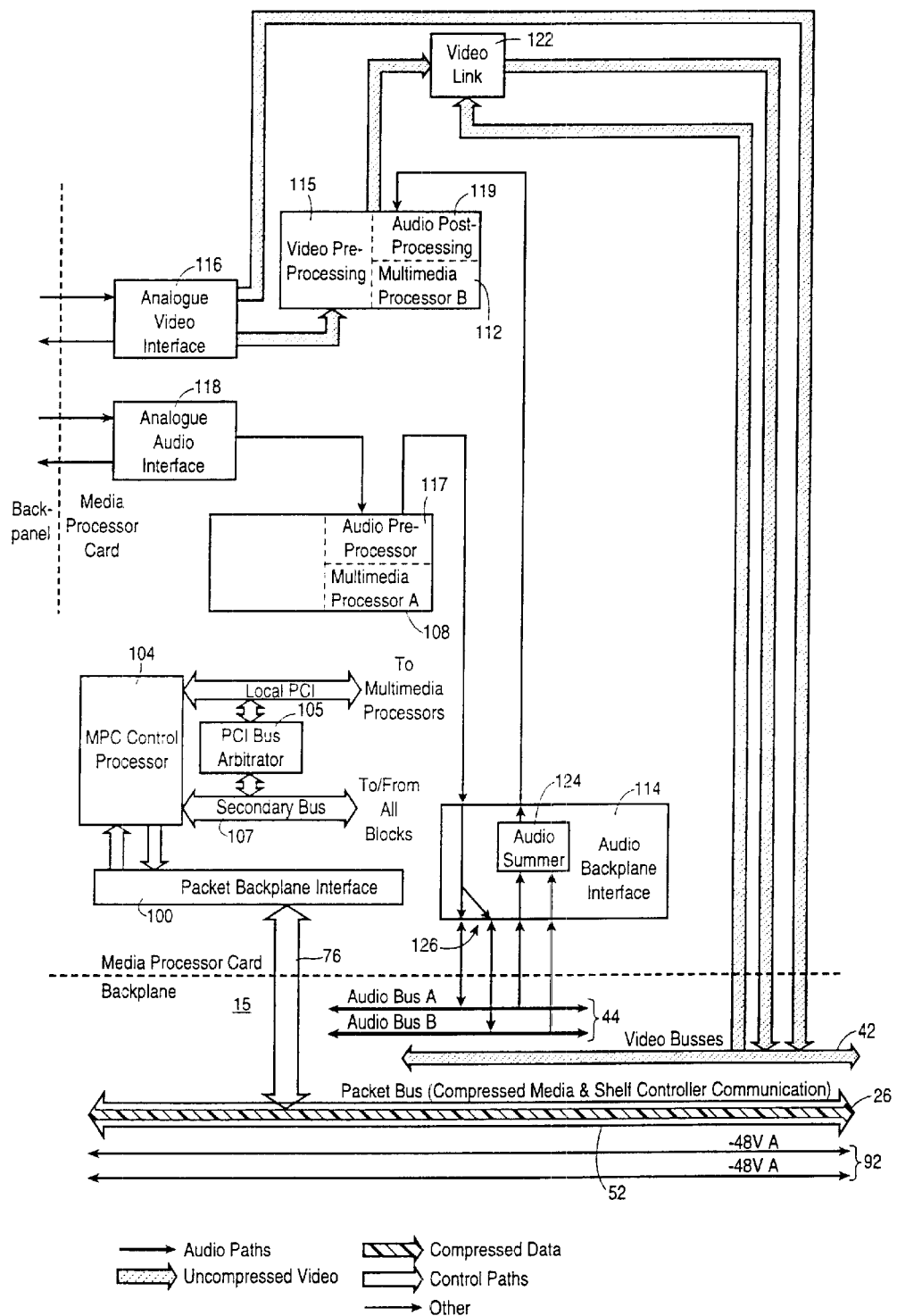
FIG. 6 shows signal flow in a media processor card for analog video and audio sources, in a single sub-frame of a media processor card.
Figure 7:
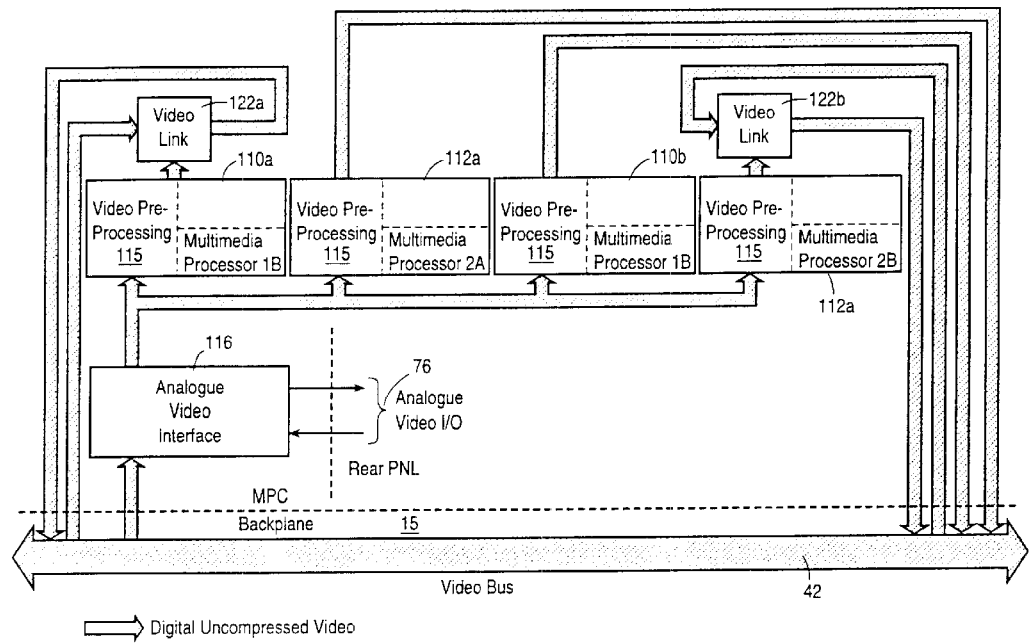
FIG. 7 is similar to FIG. 5, but showing signal interconnection in a media processor card for analog video signals, in respect of multiple sub-frames on a media processor card.

Turning now to FIGS. 6 and 7, the similarities between those Figures and FIGS. 4 and 5 will become immediately noticeable. However, each of FIGS. 6 and 7 demonstrates signal flow in the case where the input video and audio signals are analog. Thus, in FIG. 6, it will be seen that the incoming and outgoing audio signal is at the analog audio interface 118, but that the remaining audio signal handling is the same as shown in FIG. 4. Likewise, the incoming video signal is through the analog video interface 116, and the remaining video signal handling is the same as shown in FIG. 4.

With respect to FIG. 7, the analog video interface 116 is shown which receives and sends signals through the analog video port 76, but otherwise the signal handling of uncompressed video signals is the same as shown and described with respect to FIG. 5.

Figure 8:
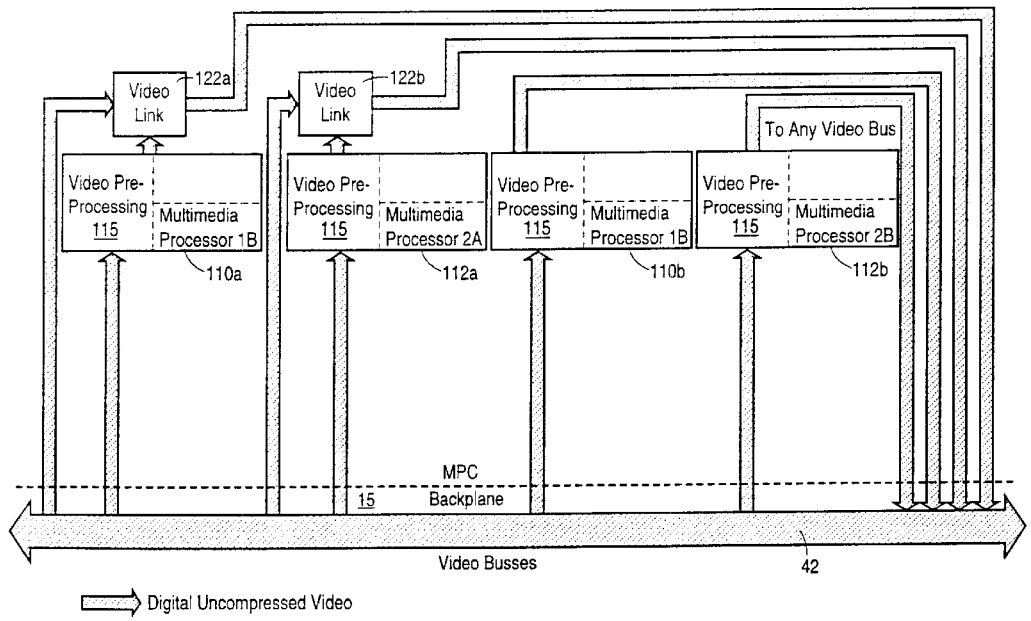
FIG. 8 shows signal interconnection in a media processor card from video buses, for video pre-processing purposes.

This brings us to FIG. 8, which shows signal handling of video signals no matter what their source, and the cascading of video signals in keeping with the present invention. Here, uncompressed video is shown being delivered from the video bus 42 to each of the video pre-processing sub-modules 115 in each of modules 110a, 112a, 110b, and 112b. It will also be noted that the outputs from the video pre-processing modules 115 in modules 110a and 112a are linked to the video links 122a and 122b. Each of those video links also receives an input from the video bus 42; and each of the video links 122a and 122b, as well as the outputs from modules 110b and 112b are all returned to the video bus 42.

From the above, it will be seen that the media processor card 34 provides a number of important functions. In a typical configuration, the video and audio data from two bi-directional video/audio ports—either MPEG or other compression protocol, or analog—are handled. Indeed, up to four bi-directional video/audio ports on a single media processor card may be handled. Accordingly, by providing a plurality of media processor cards, the number of participants in any multimedia conference and, indeed, the number of multimedia conferences, that may be handled by the central processing hub can be seen to be quite large. Moreover, as will be described hereafter, a number of media processor cards may be linked together by way of the bus controller card when functioning as a bus extender card. In any event, the media processor card functions in real-time, to provide real-time processing of video and audio signals.

Particularly as can be seen from FIGS. 5, 7, and 8, through the use of multiplexers and video links, it can be seen that custom summing, under the control of the management node 16, can be employed to provide a custom video signal to each participant in the conference. At each video link, video may be added from another conference participant, under the control of the management node. The precise manner in which the video signals are summed on a pixel-by-pixel basis, is outside the scope of the present invention.

Likewise, the audio from each participant is summed together for the other participants in a conference. However, under the control of the management node, the present invention provides that the audio signal which is returned to each participant excludes the audio input from that respective participant.

It should be noted that, typically, the multimedia processors 108 and 112 are those which employ VLIW DSP/RISC technology (very long instruction word protocol for a digital signal processor/reduced input set computer).

Especially when the video and audio input signals are compressed according to MPEG protocols, off-the-shelf devices for demultiplexing and decompression—modules 110—may be employed. However, other compression protocols than MPEG may just as easily be employed, with appropriate demodulators and decompressers being installed on the media processor card.

The control processor 104 will provide dedicated logic to the media processor card so as to provide combining video and audio data for conferencing applications, under the control of the management node.

Having regard to the interface between the packet bus 26 and the media processor card 34, the packet bus interface module 100 will sort packets on the packet bus 26 which are addressed to the particular media processor card 34 under consideration—it being understood, of course, that in a typical installation there are a plurality of media processor cards 34. The data are directed to the control processor 104, and transmitted back to the packet bus 26 under the control of the bus arbitrator 105. In operation, the packet bus interface 100 handles the packet bus arbitration process under the control of the arbitrator 105 via a secondary bus 107. For incoming packets from the packet bus 26, the packet backplane interface 100 will indicate to the packet bus 26 when it is ready to receive packets; and, for outgoing packets, packets will only be transmitted to the packet bus 26 when it is noted that sufficient bandwidth on the packet bus 26 is available. Moreover, the packet backplane interface 100 monitors all received packets from the packet bus 26 for bit errors, and it makes the error count available to the control processor 104.

Each of the multimedia processor modules 108 has several sub-modules, including a video pre-processing module 115 and an audio pre-processor 117. Video data can be sent to and received from the video router block 102, and also high-speed video data can be sent to the demultiplexer and decompression modules 110a and 110b from the modules 108a and 108b, respectively. The audio sub-module 117 sends and accepts audio to and from the audio summer, router, and backplane interface 114.

In the demultiplexer modules 110, the video data and audio data streams are selected and appropriately mapped. The transport streams are then demultiplexed into two elementary streams, one for video and one for audio. Thereafter, a program clock reference is extracted from the transport stream and used as a reference for the MPEG (or other compression protocol) system clock. Therefore, audio-to-video synchronization can be achieved.

When the audio is decompressed, the audio elementary stream is sent to a digital base-band audio at appropriate bit-rates. Two monaural or one stereo base-band signal can be thereby produced. Typically, the audio streams from the audio decoder output have a sampling frequency of 48 kHz, which is slave to a master 27 mHz system clock. Thus, time-base correction between the incoming audio sample rate and that which is derived from the system master clock can be accomplished, typically by skipping or repeating samples derived from the incoming audio sampling.

Just as noted above, the audio decoder in the demultiplexing and decompression modules 110a and 110b monitor the audio elementary stream for errors, and make account of those errors available to the control processor 104.

As to video decoding, a single elementary stream containing simple profile video data is provided having a selected line resolution with, typically, 720,544, or 352 pixels per line, with either 240 or 480 lines per frame at 30±0.03 frames per second. The bit rate transmission may vary between 1.5 Mbits per second and 15 Mbits per second. A video elementary stream is decoded, having a constant bit-rate; and presentation time stamps within the incoming data are utilized to ensure audio-to-video synchronization.

When the media processor card functions with an analog video interface 116, the operation is essentially as described above except utilizing well known analog video signal technology. Obviously, incoming analog signals according to differing protocols such as the standard North American television signal protocols, or European PAL standards, may be accommodated.

Likewise, the analog audio interface 118 is adapted to provide data to the audio summer, router, and backplane interface 114. However, in this case, the analog audio interface 118 is provided with an analog to digital converter. The video pre-processing which is carried on in sub-modules 115 of modules 112 will extract frame synchronization from the data embedded in the uncompressed video data being fed to it from the video router, video link, and video backplane interface 102. The intent of the video pre-processing at this stage is to provide appropriate signals back to the video bus 42 under the control of the management node 16. It should also be noted that video or audio clips may be downloaded from the media storage card 38 or the media library card 40 and sent to the video pre-processing modules 115 for downloading to the video bus 42. Likewise, the audio post-processing sub-module 119 is such that the output of MPEG audio encoding is provided to the packet processor 106 as shown at 109. Moreover, an analog output signal may be provided through the audio summer, router, and backplane interface 114.

Referring now to the video router, video link, and video backplane interface 102, and the video link modules 122, it will be seen that the video link function creates a bridge video output by selecting the video signal from the previous video link in the summing chain (the upstream video) and the video from the video pre-processor block 115 of a respective module 110 or 112. This is noted particularly in FIGS. 5, 7, and 8, as well as with reference to FIGS. 4 and 6. A purpose of the video link is to generate descriptors for the specific pixels for any given video stream from any given remote user, so that a video collage can be assembled by the session controller. Moreover, the size and placement of the rectangular picture frame from any specific remote user 14 may be controlled so that a plurality of rectangles having varying sizes may be placed under the control of the session controller working through the management node 16 in a collage video stream video frame which may typically have 720 by 480 pixel configuration. Each rectangle for each individual video stream from each respective remote user terminal 14 may occupy from none to the whole of the collage screen.

As to the video router function of the video router, video link, and video backplane interface block 102, the video router generally handles data which is synchronous to the 27 mHz system master clock. The video router can connect the video inputs and outputs of the video link 122 to any appropriate media bus of the plurality of media buses which comprise the media bus indicated generally at 42.

The video backplane interface provides interconnection between the video router and the backplane video buses 42.

Typically, there are a plurality of video buses, which operate in parallel one to another. The bandwidth of the composite video bus may thereby be increased over the bandwidth of any one video bus. Moreover, by the provision of a plurality of video buses—and also a plurality of audio buses—redundancy is provided with respect to the video buses and the audio buses within the media bus 24.

As to the audio summer, router, and backplane interface 114, the audio summer 124 will generate two audio outputs which may be bridged monaural audio streams, or a stereo audio stream. The audio router function interconnects the digital outputs of the analog audio interface 118, the audio pre-processing or post-processing blocks 117 and 119 of any of the multimedia processor modules 108 and 112; and the audio router will forward the output of the audio summer to the digital inputs of the analog audio interface 118 and the audio processing block 117 or 119 of any multimedia processor 108 or 112. As well, the audio router functions, of course, to route audio data to the audio backplane via the audio backplane interface.

The control processor module 104 of the media processor card 34 facilitates communication between the media processor card 34 and the backplane via the packet backplane interface 100. Moreover, the control processor 104 will also provide a read/write bus to provide for interfacing to other modules on the media processor card; and it provides a FLASH memory which is adequate to hold the control program for the media processor card and the operating system therefor.

The UART 120 provides translation between the RS-232 port 80 and the control processor 104. The UART 120 provides a port through which external equipment, such as a gateway device, can be controlled or through which testing and debugging of the media processor card 34 can be performed.

It can be appreciated that the video encoding by which video signals are returned to the plurality of remote users 114 will generally be found on the media processor card 34. However, a video encoder card 36 may, as noted, be provided.

In any event, it will be appreciated that video and audio data signals which are received from the plurality of remote user terminals are received by the central processing bus via any media processor card or, as described hereafter, via any physical interface card. Video and audio data signals are passed via the media bus 24, comprising the video bus 42 and the audio bus 44, or the packet bus 26, for further processing. It will also be seen from the above that video and audio signals which are delivered from the central processing hub 12 to the plurality of remote user terminals 14 are delivered from a media processor card 34 or, as described hereafter, a physical interface card 32.

Figure 9:
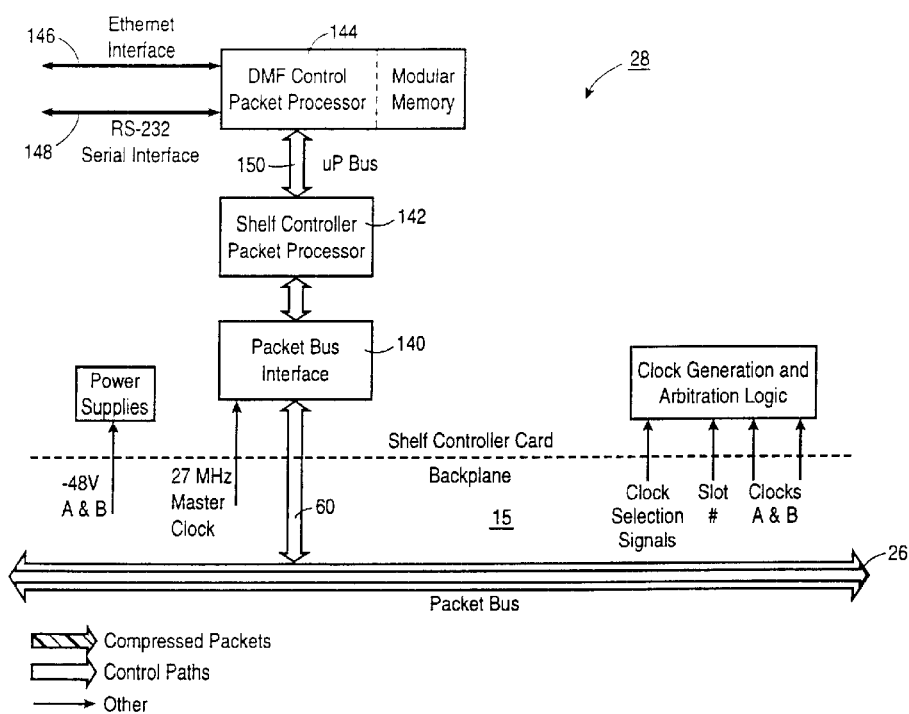
FIG. 9 is simplified block schematic of a shelf controller card.

Turning now to FIG. 9, some details of the shelf controller card 28 are shown. As previously noted, it is the particular purpose of the shelf controller card 28 to issue control messages to control the operation of the central processing hub 12, in keeping with incoming management signals which are delivered directly to the shelf controller card 28 from a management node 16. It will be seen that the shelf controller card 28 includes a packet bus interface 140, a packet processor module 142, and a control processor 144. The shelf controller card 28 communicates with the management node 16 through either an Ethernet interface 146 or an RS-232 serial interface 148.

The packet bus interface 140 communicates with other cards in the central processing hub 12 via the packet bus 26. Control signals are transmitted to and from the shelf controller card 28 via the packet bus interface 140, as shown as 60. The links to the other cards in the central processing hub 12 transmit data including control and status information, and may be employed to transmit audio and video files which are not "real-time" in nature. The packet bus interface 140 handles packet bus arbitration, in the same manner that the packet backplane interface 100 handles packet bus arbitration for the media processor cards 34. Thus, for incoming packets of data from the packet bus 26, the packet bus interface 140 indicates when it is ready to receive packets; and it will transmit data packets to the packet bus 26 only when the packet bus 26 indicates that bandwidth is available. Likewise, all received packets are monitored for bit errors, and that error count is made available to the media processor card control processor 104.

The shelf controller packet processor 142 provides an interface between the control processor 144 and, through the packet bus interface 140, to the rest of the central processing hub 12.

The control processor 144 includes non-volatile RAM, FLASH memory, and provides a microprocessor bus 150 for communicating with the packet processor 142.

Figure 10:
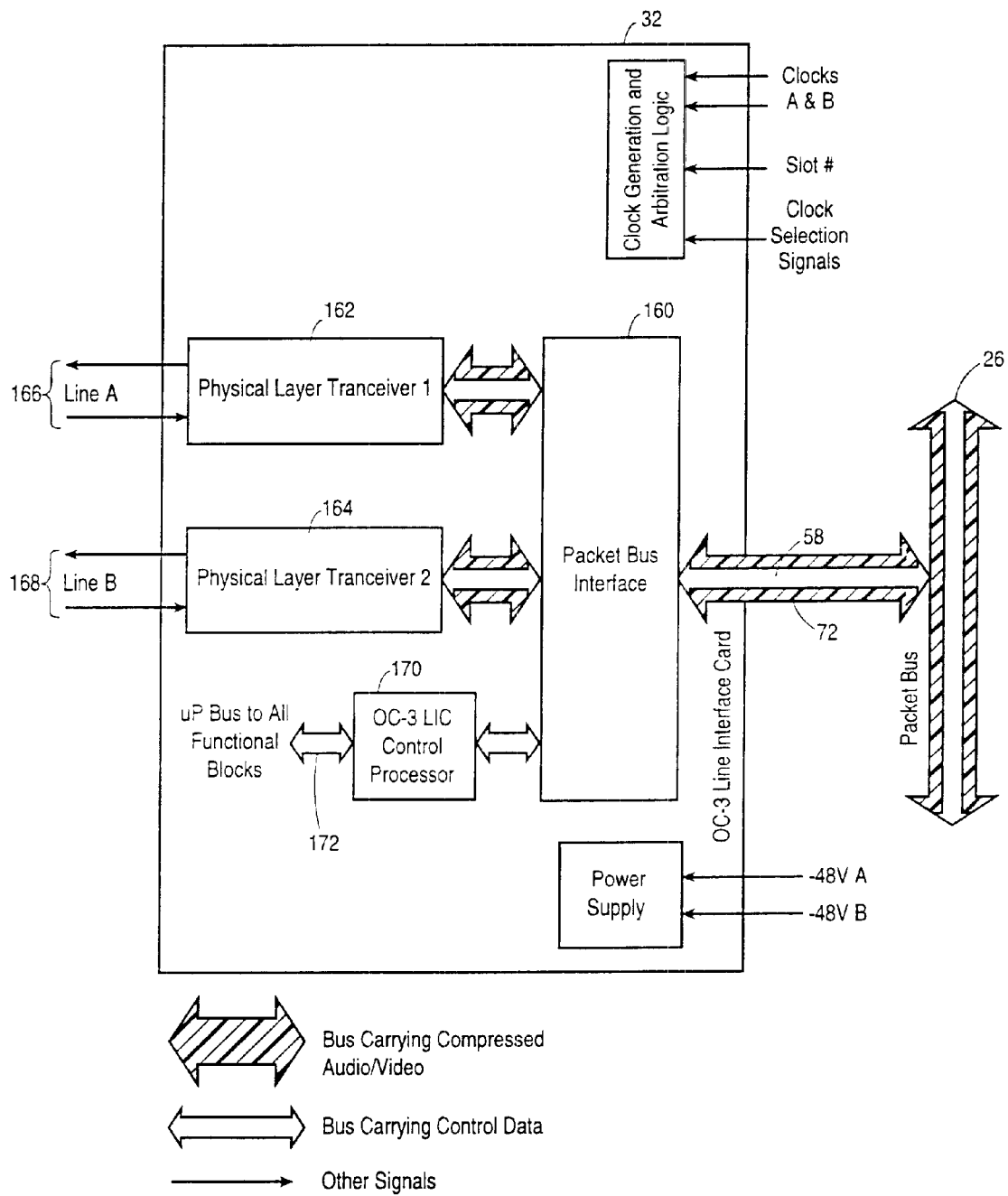
FIG. 10 is simplified block schematic of a line interface card.

Referring to FIG. 10, a block diagram is shown for a typical physical line interface card 32. As noted above, the purpose for the physical line interface card 32 is to provide the physical interface port or ports for the central processing hub, and it may also provide data link layer functions.

Once again, the line interface cards 32 communicate to the packet bus 26 as shown at 58 and 72. The communication between the line interface cards 32 and the packet bus 26 is established through a packet bus interface module 160.

Each physical line interface card 32 is provided with a pair of physical layer transceivers 162 and 164, through which bi-directional communication may be established with external networks 18 and 20 so as to establish communication with the remote user terminals 14, as shown at 166 and 168. Also, as above, the physical line interface cards 32 are provided with a control processor 170, in which appropriate software resides, and which is provided with FLASH memory and a microprocessor bus 172.

Figure 11:
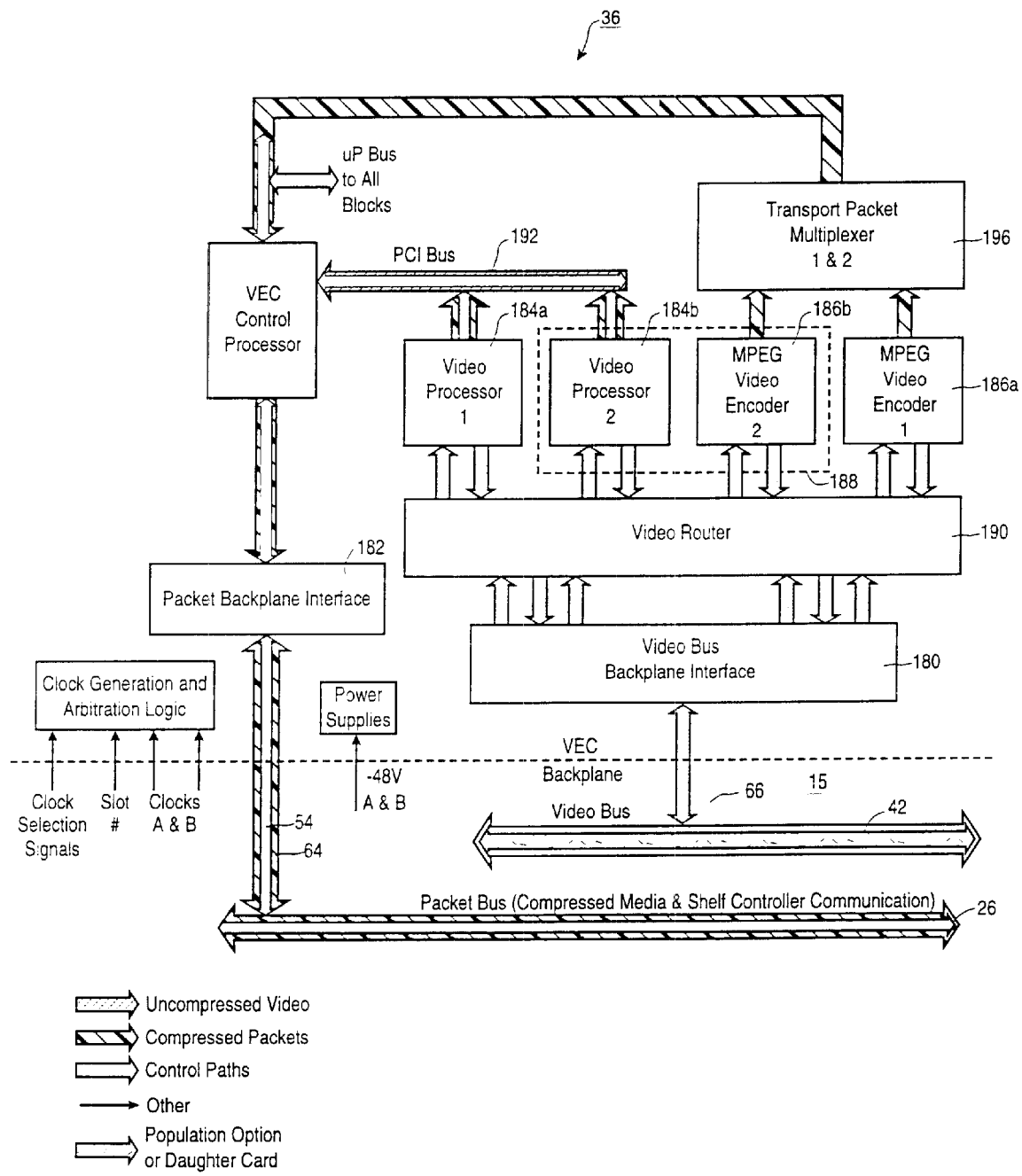
FIG. 11 is a simplified block schematic of a video encoder card, when used.

FIG. 11 provides a block schematic, showing signal interconnections, for a typical video encoder card, if it is employed. The functions of the video encoding having already been described above. In any event, it will be noted that the purpose of a video encoder card 36 is to compress the video collage which is associated with the ongoing multimedia conference, before passing it back to the packet processor 106 on the media processor cards 34. Compression of the video signal, of course, will increase the number of participants in any given conference—or the number of conferences—that can be handled by the multimedia conferencing system at any time.

Each video encoder card 36 communicates with the video bus 42 as shown at 66, where the signals are received by a video bus backplane interface 180. Each video encoder card 36 also communicates uni-directionally with compressed packets to the packet bus 26, as shown at 64 and bi-directionally with respect to control data as shown at 54. That communication is handled through a packet backplane interface 182.

The video encoder card is shown having two video processors 184*a* and 184*b*, and two video encoder modules 186*a* and 186*b*. The video encoder card 36 is such that the video processor 184*b* and the video encoder 186*b* are not necessarily present, but might be. If so, they might be installed on a daughter card 188.

The video router 190 interconnects the video bus backplane interface 180 to and from the video processors 184 and to the video encoders 186. The outputs from the video processors 184*a* and 184*b*, when present, are delivered as compressed packets 192 to the control processor 194 which, in turn, delivers compressed packets to the packet backplane interface 182 for delivery to the packet bus 26.

Output from the video encoders 186 is delivered through a transport packet multiplexer 196, and also to the control processor 194, as compressed packets, for subsequent delivery to the packet backplane interface 182 and thence to the packet bus 26.

Figure 12:
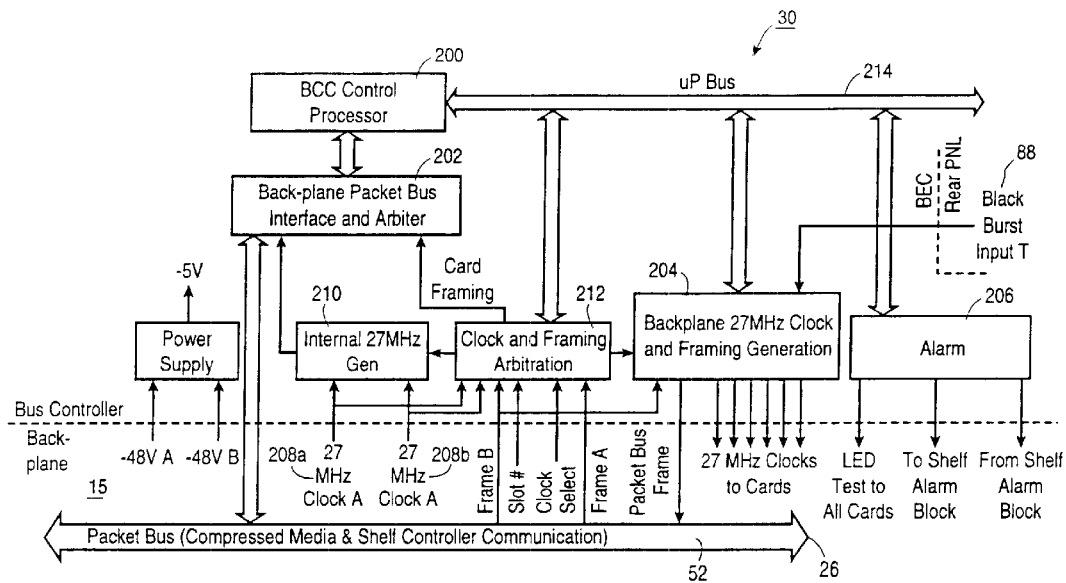
FIG. 12 is a simplified block schematic of a bus controller card.

Turning now to FIG. 12, a block schematic is shown for the bus controller card 30. Here, the purpose of the bus controller card is to provide system level signals such as the system clock and the bus arbitration control signals which are required by the central processing hub and its various line cards. In this case, the communication to and from the packet bus is only in respect of control data, as shown at 52.

The bus controller card is provided with a control processor 200, a backplane packet bus interface and arbiter module 202, a clock generator 204 which delivers clock signals via a clock distribution bus 48 as shown in FIG. 2, and an alarm block 206. Two additional clocks 208a, 208b are used to generate the clocks and frames for transferring data on the packet bus 26, and are used to synchronize the backplane clocks on the clock distribution bus 48 with frame outputs from the packet bus 26 when the bus controller card is in a slave mode. To accommodate those functions, an internal clock generator 210 and a clock and framing arbitration block 212 are also provided.

To accommodate passage of control signals between the clock and framing arbitration block 212, the clock generator 204, the alarm block 206, and the control processor 200, a microprocessor bus 214 is provided.

The purpose of the alarm block 206 is simply to provide alarm signals, when necessary.

The control processor 200 provides the necessary hardware to control communication from the bus controller card through the backplane packet bus interface to the packet bus. As before, the control processor 200 provides a read/write bus for other hardware on the bus controller card, and adequate FLASH memory to hold the control program for the bus controller card and its operating system.

The backplane packet bus interface and arbitration block 202 handle packet bus arbitration in the same manner as described previously. It also monitors all received packets for bit errors. However, the backplane packet bus interface 202 is also the focal point in the central processing hub for all packet bus arbitration. Accordingly, any port on the packet bus 26 can request connection to any other port on any card in the central processing hub 12 through the backplane bus interface and arbitration block 202. The backplane packet bus interface and arbitration module 202 is controlled so that, if access to any port on any card in the central processing hub 12 is requested by more than one transmitting port, a decision is made as to which transmitting port access to the requested port will be granted. Thus, no transmitting port will be blocked by another transmitting port.

Figure 13:
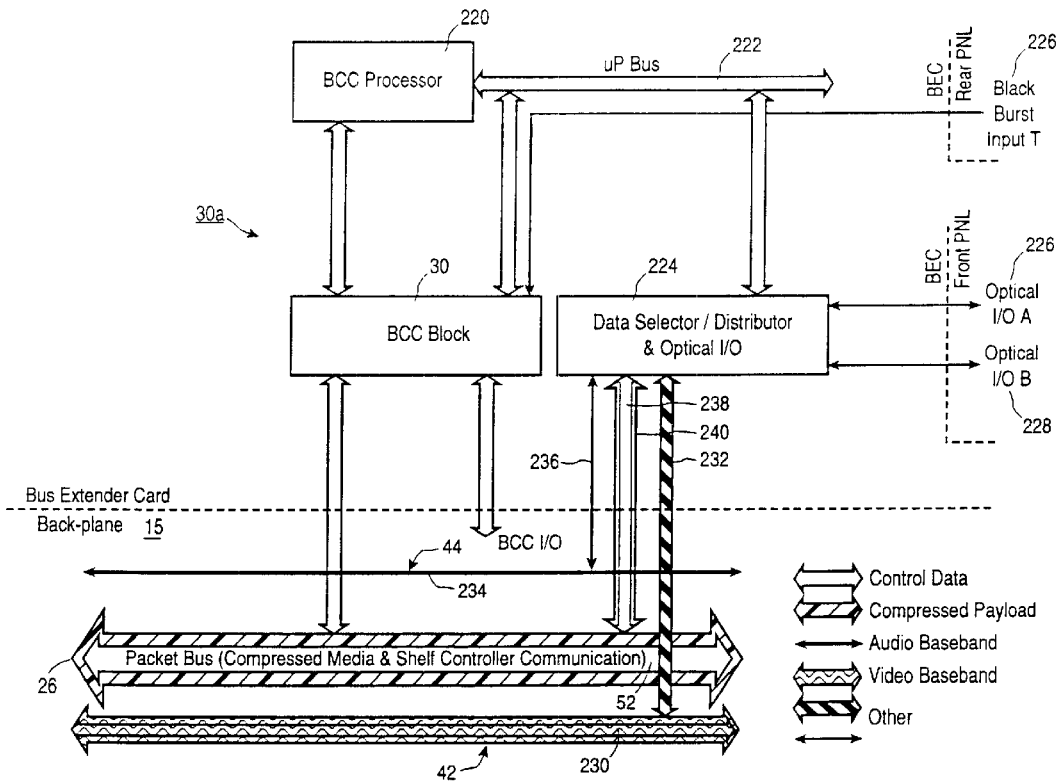
FIG. 13 is a simplified block schematic of a bus extender card.

Finally, reference is made to FIG. 13 which shows a block schematic diagram for a bus extender card 30a. Here, the bus extender card includes all of the functions of the bus controller card, together with additional functions whereby any central processing hub 12 can be interconnected to other central processing hubs 12a by linking their media buses 24 and packet buses 26.

In this case, a processor 220 is provided, together with a microprocessor bus 222 and a data selector and distributor module 224. The data selector and distributor module 224 is provided with optical input and output ports 226 and 228, so that high-speed, broad-band communication may be attained. Video baseband buses 230 communicate to and from the data selector and distributor module 224, as shown at 232. That data is essentially uncompressed video data, from the video buses 42. Likewise, the audio baseband buses 234—which essentially comprise the audio buses 44—communicate with the data selector and distributor block 224 as shown at 236. Control data 52 are communicated to the data selector and distributor block 224 as shown at 238; and compressed data are delivered from the packet bus 26 as shown at 240.

It will be appreciated that a session manager (not shown)—which may be an intelligent network, a personal computer, or an individual person who interacts with an intelligent network or a personal computer—may control the nature of the output video and audio data signals which are sent to any of the remote user terminals 14 by communicating with the management node 16 through an input port which is provided for that purpose (not shown). In any event, the input port for the management node 16, just as the input ports 146 and 148 to the shelf controller card 28, with which the management node 16 communicates, may be RS-232 or Ethernet. Indeed, communication between the management node 16 the shelf controller card may also be in keeping with ATM (asynchronous transmission mode) protocol.

As previously noted, the video and audio data signals which are received from and delivered to each of the plurality of remote user terminals 14 are generally in the form of compressed signal packets. However, it has also been noted that the video and audio data signals received from and delivered to the remote user terminals 24 may be in the form of analog signals. If so, the analog signals are passed to and from the central processing hub 12 via analog ports 116, 118 on the media processor card 34. When the video and audio data signals comprise compressed signal packets, it has been noted that the compressed signal packets are delivered from the video encoding means to the packet bus, and bi-directionally between the packet bus and any line interface card 32 or media processor card 34. Moreover, uncompressed video and audio real-time signals are delivered uni-directionally between the media bus 24 and any of the media processor cards 34 or the video encoding means such as the video encoding cards 36.

On the other hand, even when the video and audio data signals received from and delivered to the remote user terminals 14 are in the form of analog signals, compressed signal packets will be delivered from the video encoding means such as the video encoding card 36 to the packet bus 26, and bi-directionally between the packet bus and any line interface card 32 or media processor card 34. As above, uncompressed video and audio real-time signals are delivered uni-directionally between the media bus 24 and the media processor cards 34 and video encoding means such as the video encoder cards 36.

When at least one video link 122 is provided on the media processor cards 34, and a video router 102 (or 190) is provided, then video data signals from any of the plurality of remote user terminals will be summed within the media processor cards. The resultant summed video data signal is passed to a further video link 122 via the video router 102. Thus, after further processing, the returned video data signal which is transmitted from the central processing hub 12 to the plurality of remote user terminals is derived from a cascade of video links 122.

Clearly, the media processor card performs at least the task of signal decoding of video data and audio data received by each media processor card, and signal routing of video data and audio data received by any respective media processor card, together with signal scaling and time-based correction of video data and audio data. Video data and audio data received by the media processor card are linked within the media processor card or to other media processor cards.

Just as there may be a redundancy of video and audio buses, so to may there be a redundancy of physical line interface cards 32 or media processor cards 34. That means that faulty cards may be identified and their function transferred to other identical cards which may be mounted on the same physical mounting shelf. Moreover, it also means that additional cards may be added dynamically, so as to increase the capacity of the multimedia conferencing system, at any time.

Still further, the media bus and packet bus of any central processing hub 12 may be extended through the bus controller card, as noted above, to at least one further media bus 24 and one further packet bus 26 of another central processing hub 12a, so that a plurality of similar central processor hubs 12 may be connected to one another in such a manner that they share their resources, control signals, clock signals, and bus arbitration signals. Moreover, by such an interlinking between similar central processing hubs, video links 122 on the media processing cards 34 of each of the interlinked central processing hubs 12 may be cascaded one with respect to another, as noted above.

Under the control of the session manager, the summed video data signal which is delivered to each of the remote user terminals 14 may be a common signal which is delivered to all of the remote user terminals. Further, the nature of that video signal may be changed by the session manager at any time.

Otherwise, the summed video data signal which is delivered to each of the remote user terminals 14 under the control of the session manager may include video data from at least one of the other remote user terminals 14, but not necessarily all of the remote user terminals.

In any event, the audio data signal which is delivered to each of the remote user terminals is generally such that it will include audio data from at least one of the other of the remote user terminals, but will exclude audio data from the respective remote user terminal 14 to which the summed audio signal is delivered.

It has been noted that the video data signal which is received from any of the plurality of remote user terminals 14 will include a video stream. However it may also include other data which may be graphics data, text data, or spreadsheet data, any of which is recovered from a computer at the respective remote terminal site.

From the above discussion of the respective cards which are included in the central processing hub, it is clear that each respective card performs a predesignated task in keeping with respective instruction sets which are in the respective microprocessors included in the respective control processors on each of the cards. Those predesignated tasks are also carried out in keeping with control signals which are delivered to each of the respective cards over the packet bus 26.

There has been described a multimedia conferencing system and a central processing hub therefor, including detailed description of various cards which are included in the central processing hub, and their purposes and functions. However, other modifications and/or alterations may be made in respect of the multimedia conferencing system described herein, without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially identical is intended to mean identical, nearly identical and/or exhibiting characteristics associated with being identical.

What is claimed is:

1. A multimedia conferencing system comprising a central processing hub and a plurality of remote user terminals, wherein each of said remote user terminals at least comprises means for sending video data signals and audio data signals to said central processing hub and means for receiving video data signals and audio data signals from said central processing hub, wherein said central processing hub receives the video and audio data from each of said plurality of remote user terminals, processes the received video data and audio data, and returns a video data signal and an audio data signal to each of said remote user terminals, and wherein each of said video data signal and audio data signal includes video data and audio data, respectively, from at least one of said plurality of remote user terminals; wherein said central processing hub comprises:

a media bus for handling video and audio data signals within said central processing hub;

a packet bus for handling data and control signals within said central processing hub;

a shelf controller card for issuing control messages to control the operation of said central processing hub in keeping with incoming management signals delivered directly to said shelf controller card;

a bus controller card for providing at least clock signals and bus arbitration signals within said central processing hub;

at least one physical line interface card for providing at least one physical interface port for said central processing hub;

at least one media processor card for processing video and audio signals within said central processing hub; and video encoding means for at least receiving video data from each said at least one media processor card, and for delivering video data signals to said packet bus;

wherein video and audio data signals received from said plurality of remote user terminals are received by said central processing bus by any one of said at least one media processor card and said at least one physical interface card, and said video and audio data signals are passed via one of said media bus and said packet bus to said at least one media processor card for further processing;

wherein video and audio data signals delivered from said central processing hub to said plurality of remote user terminals are delivered from said central processing hub by any one of said at least one media processor card and said at least one physical interface card; and wherein the means for sending and receiving video and audio data signals which are located at each one of said plurality of remote user terminals may differ from one remote user to another, and wherein each of said plurality of remote user terminals may communicate with said central processing hub using a different communications protocol than any other of said plurality of remote user terminals.

2. The multimedia conferencing system of claim 1, wherein said video encoding means comprises a video encoder card.

3. The multimedia conferencing system of claim 1, wherein said video encoding means is included in at least one of said at least one media processor card.

4. The multimedia conferencing system of claim 1, wherein said shelf controller card further comprises means for communicating with a management node, thereby permitting management signals for said central processing hub to be delivered by said management node to and received from said shelf controller card.

5. The multimedia conferencing system of claim 4, wherein a session manager for any multimedia conferencing session may control the nature of the output video and audio data signals sent to said plurality of remote user terminals by communicating with said management node through an input port thereto.

6. The multimedia conferencing system of claim 5, wherein said session manager is chosen from the group consisting of an intelligent network, a personal computer, and an individual person who interacts with an intelligent network or a personal computer.

7. The multimedia conferencing system of claim 5, wherein the input port of said management node operates under a protocol chosen from the group consisting of RS-232, Ethernet, and ATM.

8. The multimedia conferencing system of claim 5, further comprising at least one video link on said at least one media processing card, and a video router on said at least one media processing card, whereby video data signals from any of said plurality of remote user terminals are summed within said media processing card, and the resultant summed video data signal is passed to a further video link via said video router, and whereby said returned video data signal from said central processing hub to said plurality of remote user terminals is derived from a cascade of video links.

9. The multimedia conferencing system of claim 8, wherein said bus controller card further comprises means for connecting said media bus and said packet bus to at least one further media bus and one further packet bus, respectively, of at least one further central processing hub, whereby a plurality of similar central processor hubs are interconnected one to another in such a manner as to share all resources, control signals, clock signals, and bus arbitration signals; and wherein said at least one video link on said at least one media processing card on each of said plurality of similar central processor hubs are cascaded one with respect to another.

10. The multimedia conferencing system of claim 9, wherein the nature of the respective summed video data signal which is delivered to any respective one of said remote user terminals is under the control of said session manager, whereby each respective one of said summed video data signals includes video data from at least one other of said remote user terminals; and wherein the audio data signal which is delivered to each of said remote user terminals includes audio data from at least one other of said remote user terminals and excludes audio data from that respective remote user terminal to which the summed audio signal is delivered.

11. The multimedia conferencing system of claim 8, wherein the summed video data signal which is delivered to each of said remote user terminals is a common signal delivered to all of said remote user terminals; and wherein the audio data signal which is delivered to each of said remote user terminals includes audio data from at least one other of said remote user terminals and excludes audio data from that respective remote user terminal to which the summed audio signal is delivered.

12. The multimedia conferencing system of claim 11, wherein the nature of the summed video signal which is delivered to each of said remote user terminals is under the control of said session manager, whereby the video signal in said summed signal which is representative of any remote user terminal may be changed by said session manager.

13. The multimedia conferencing system of claim 8, wherein the summed video data signal which is delivered to each of said remote user terminals is under the control of said session manager, whereby each respective one of said summed video data signals includes video data from at least one other of said remote user terminals; and wherein the audio data signal which is delivered to each of said remote user terminals includes audio data from at least one other of said remote user terminals and excludes audio data from that respective remote user terminal to which the summed audio signal is delivered.

14. The multimedia conferencing system of claim 8, wherein the video data signal which is received from any of said plurality of remote user terminals includes a video stream together with other data chosen from the group consisting of graphics data recovered from a computer at the respective remote terminal site, text data recovered from a computer at the respective remote terminal site, spread sheet data recovered from a computer at the respective remote terminal site, and combinations thereof.

15. The multimedia conferencing system of claim 14, wherein any of said graphics data, text data, and spread sheet data that are received by said central processing hub are distributed by said central processing hub to at least one of said remote user terminals as the respective data.

16. The multimedia conferencing system of claim 14, where any of said graphics data, text data, and spread sheet data that are received by said central processing hub are processed by said central processing hub under the control of said session manager before being distributed by said central processing hub to at least one of said remote user terminals as processed data.

17. The multimedia conferencing system of claim 1, wherein the video and audio data signals received from and delivered to each of said plurality of remote user terminals is in the form of compressed signal packets.

18. The multimedia conferencing system of claim 17, wherein compressed signal packets are delivered from said video encoding means to said packet bus, and bidirectionally between said packet bus and any of said at least one line interface card, and any of said at least one media processor card; and wherein uncompressed video and audio real time signals are delivered uni-directionally between said media bus and any of said at least one media processor card and said video encoding means.

19. The multimedia conferencing system of claim 1, wherein the video and audio data signals received from and delivered to each of said plurality of remote user terminals are in the form of analog signals which are passed to and from said central processing hub via analog ports on said at least one media processor card.

20. The multimedia conferencing system of claim 19, wherein compressed signal packets are delivered from said video encoding means to said packet bus, and bidirectionally between said packet bus and any of said at least one line interface card, and any of said at least one media processor card; and wherein uncompressed video and audio real time signals are delivered uni-directionally between said media bus and any of said at least one media processor card and said video encoding means.

21. The multimedia conferencing system of claim 1, wherein said media bus comprises at least one video bus, and at least one audio bus.

22. The multimedia conferencing system of claim 21, wherein there is a plurality of video buses operating in parallel one to another, whereby the bandwidth of the composite video bus is increased over the bandwidth of any one video bus.

23. The multimedia conferencing system of claim 21, wherein there are at least two audio buses which are adapted to be operated in parallel so as to increase the bandwidth of the composite audio bus over the bandwidth of one audio bus, or as two separate audio buses so as to provide stereo audio signals.

24. The multimedia conferencing system of claim 21, wherein there is a plurality of video buses and a plurality of audio buses, whereby there is redundancy provided with respect to said video buses and said audio buses.

25. The multimedia conferencing system of claim 1, wherein there is a plurality of physical line interface cards and a plurality of media processor cards, whereby there is redundancy provided with respect to said physical line interface cards and said media processor cards.

26. The multimedia conferencing system of claim 1, wherein additional physical line interface cards and additional media processor cards are added to said central processing hub, by being connected to said media bus and said packet bus, at any time.

27. The multimedia conferencing system of claim 1, wherein each respective card performs pre-designated tasks in keeping with respective instruction sets which are in respective microprocessors on each respective card, and further in keeping with control signals delivered to each respective card over said packet bus.

28. The multimedia conferencing system of claim 1, wherein the video data and audio data received from at least some of said plurality of remote terminals are summed.

29. The multimedia conferencing system of claim 1, wherein said media processor card performs tasks chosen form the group consisting of signal decoding of video data and audio data received by said media processor card, signal routing of video data and audio data received by said media processor card, signal scaling of video data and audio data received by said media processor card, time-base correction for video data and audio data received by said media processor card, linking of video data and audio data received by said media processor card, and combinations thereof.

* * * * *